United States Patent
Zhang et al.

(10) Patent No.: US 7,069,998 B2
(45) Date of Patent: Jul. 4, 2006

(54) FUEL CELL FOR DOWNHOLE AND SUBSEA POWER SYSTEMS

(75) Inventors: Wenlin Zhang, Missouri City, TX (US); Kenneth L. Havlinek, Houston, TX (US); Vance E. Nixon, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 29 days.

(21) Appl. No.: 10/455,135

(22) Filed: Jun. 5, 2003

(65) Prior Publication Data

US 2003/0196814 A1   Oct. 23, 2003

Related U.S. Application Data

(63) Continuation of application No. 09/858,228, filed on May 15, 2001, now Pat. No. 6,575,248.

(60) Provisional application No. 60/285,769, filed on Apr. 23, 2001, provisional application No. 60/204,676, filed on May 17, 2000.

(51) Int. Cl.
   E21B 29/12 (2006.01)
   E21B 29/02 (2006.01)
(52) U.S. Cl. .................. 166/338; 166/65.1; 166/302
(58) Field of Classification Search ............... 166/338, 166/368, 65.1, 302
   See application file for complete search history.

(56) References Cited

U.S. PATENT DOCUMENTS

| | | | | |
|---|---|---|---|---|
| 2,643,087 A | * | 6/1953 | Ogorzaly et al. | 175/93 |
| 3,278,335 A | * | 10/1966 | Hitzman | 429/2 |
| 3,280,923 A | * | 10/1966 | Muench | 376/273 |
| 3,342,267 A | * | 9/1967 | Cotter et al. | 166/60 |
| 3,664,442 A | * | 5/1972 | Rosser et al. | 175/231 |
| 3,665,955 A | * | 5/1972 | Conner, Sr. | 137/495 |
| 4,629,537 A | * | 12/1986 | Hsu | 429/32 |
| 4,738,904 A | * | 4/1988 | Ludwig et al. | 429/17 |
| 4,808,037 A | * | 2/1989 | Wade et al. | 405/226 |
| 4,826,742 A | * | 5/1989 | Reiser | 429/33 |
| 5,202,194 A | * | 4/1993 | VanBerg, Jr. | 429/13 |
| 5,344,721 A | * | 9/1994 | Sonai et al. | 429/20 |
| 5,935,725 A | * | 8/1999 | Dhar et al. | 429/12 |
| 6,082,452 A | * | 7/2000 | Shaw et al. | 166/105.5 |
| 6,138,758 A | * | 10/2000 | Shaw et al. | 166/265 |
| 6,150,601 A | * | 11/2000 | Schnatzmeyer et al. | 136/201 |
| 6,279,658 B1 | * | 8/2001 | Donovan et al. | 166/313 |
| 6,397,946 B1 | * | 6/2002 | Vail, III | 166/250.01 |
| 6,454,011 B1 | * | 9/2002 | Schempf et al. | 166/381 |
| 6,675,888 B1 | * | 1/2004 | Schempf et al. | 166/65.1 |
| 6,684,948 B1 | * | 2/2004 | Savage | 166/248 |
| 6,686,079 B1 | * | 2/2004 | Zhang et al. | 429/25 |

FOREIGN PATENT DOCUMENTS

| | | |
|---|---|---|
| EP | 1018774 A1 | 7/2000 |
| GB | 1144322 A | 3/1966 |
| GB | 1190601 A | 5/1970 |
| WO | WO 1999/027599 A1 | 10/1998 |
| WO | WO 2001/097310 A1 | 6/2001 |

* cited by examiner

*Primary Examiner*—Thomas A Beach
(74) *Attorney, Agent, or Firm*—Williams, Morgan & Amerson, P.C.

(57) ABSTRACT

This invention relates to fuel cells, and in one embodiment, to fuel cells that are especially well suited for downhole use in oil and gas wells, and for subsea use in connection with offshore wells.

6 Claims, 18 Drawing Sheets

FUEL CELL FOR DOWNHOLE AND SUBSEA POWER SYSTEMS

This application is a continuation of prior application Ser. No. 09/858,228, filed May 15, 2001, now U.S. Pat. No. 6,575,248. Further, this application claims the benefit of U.S. Provisional Application No. 60/204,676, filed May 17, 2000, and U.S. Provisional Application No. 60/285,769, filed Apr. 23, 2001.

TECHNICAL FIELD OF THE INVENTION

This invention relates to fuel cells, and in one embodiment, to fuel cells that are especially well suited for downhole use in oil and gas wells, and for subsea use in connection with offshore wells. The invention can also be useful for commercial energy generation, powering electric vehicles, and powering other equipment, for example, communication and control equipment located in remote areas away from commercially available power sources.

BACKGROUND OF THE INVENTION

Several types of equipment used downhole in oil and gas wells, or beneath the surface of the sea adjacent to offshore wells, are electrically operated or actuated. Examples of such equipment include certain wireline tools and remote well telemetry equipment. The electrical power required can be provided by connecting the device to a surface power source via electrical cables, or by placing a power source near the site of the device itself. Often it is not practical to use electrical cables running from the surface to the subterranean or subsea site of the electrically-powered device, because of the great distance involved, or because the cables can interfere with the passage of other equipment through the wellbore, and are vulnerable to being damaged during well operations.

Batteries can be used as a local source of power for downhole and subsea electrical devices, but are subject to their own problems. For example, increasing the power and energy generation capacity of a battery generally requires a proportionate increase in the size of the battery, which can present difficulties given the space constraints that exist in wellbores. Also, batteries will typically need to be electrically recharged at some point, thereby often making it necessary to provide some type of recharging equipment in physical proximity to the battery.

Fuel cells make use of an electrochemical reaction involving a fuel and an oxidant in a cell that comprises an anode, cathode, and electrolyte, to generate electricity without also generating the unwanted by-products associated with combustion, while providing relatively higher energy efficiency. Thus, fuel cells potentially have a number of advantages over other power generation or storage means in many applications. The fuel cells of the present invention can be used in a variety of applications. Although the invention is primarily described herein in relation to applications involving subterranean wellbores, it should be understood that the invention can be used in applications other than wellbore applications.

A number of obstacles have hindered the use of fuel cells in downhole and subsea applications. For instance, fuel cells typically include one or more pumps to provide circulation of fuel and/or oxidant in a closed loop through the cell. If such a pump fails downhole, repair or replacement can be extremely expensive, given the need to retrieve the fuel cell to the surface. Further, the operation of the pumps consumes some of the energy produced by the cell, thus reducing the net power yield available to operate an external device. This latter point can be a significant problem in downhole or subsea applications in which a supply of power is needed for an extended period of time, and yet space constraints limit the ability to simply increase the size of the fuel and oxidant reservoirs. Additionally, the reaction product, water vapor, needs to be removed from the fuel cell stack in order to continuously run the fuel cell. Removal of the water downhole and in a subsea environment presents a challenge because the surrounding pressure is higher than that present in a conventional fuel cell placed at surface in an ambient environment and operating in air. Using a pump to expel the water into the high pressure downhole or subsea environment may require a large amount of power making such a system impractical.

VanBerg U.S. Pat. No. 5,202,194 describes a power supply for providing electricity to electrical circuits located downhole in a well. The power supply comprises a fuel cell, which is fed by hydrogen from a pressure container and oxygen from compressed oxygen gas bottles. Pressure regulators are located in the line between the hydrogen container and the fuel cell, and in the line between the oxygen bottles and the fuel cell. A pump is used to eject water from the fuel cell into the wellbore. The need to have a water outflow path from the interior of this fuel cell to its exterior raises potential reliability issues and may be impractical for downhole use.

There is a need for a new fuel cell operation concept and an improved fuel cell apparatus that can provide the electrical power needed to operate various downhole and subsea equipment.

DETAILED DESCRIPTION OF EMBODIMENTS

Embodiments of the present invention provide a practical means of using fuel cells in downhole or subsea locations to power electrical devices that are used far below the surface of the well or the surface of the water. However, it should be understood that the fuel cells of the present invention can be used in other contexts as well, and the invention is not limited to subsea and downhole uses in or around oil or gas wells. In some applications, a fuel cell can supply more reliable and a greater cumulative quantity of power than alternative forms of energy, such as batteries. The greater energy and power density of a fuel cell over other alternatives can often decrease the weight and size of the overall power unit. The decrease in size of the fuel cell power unit can enable the use of instruments and tools requiring electrical power in applications where they could not be utilized before. Fuel cells are considered an environmentally clean energy source since the primary waste product generated from fuel cell usage is water (assuming a fuel source of hydrogen).

Figure 1:
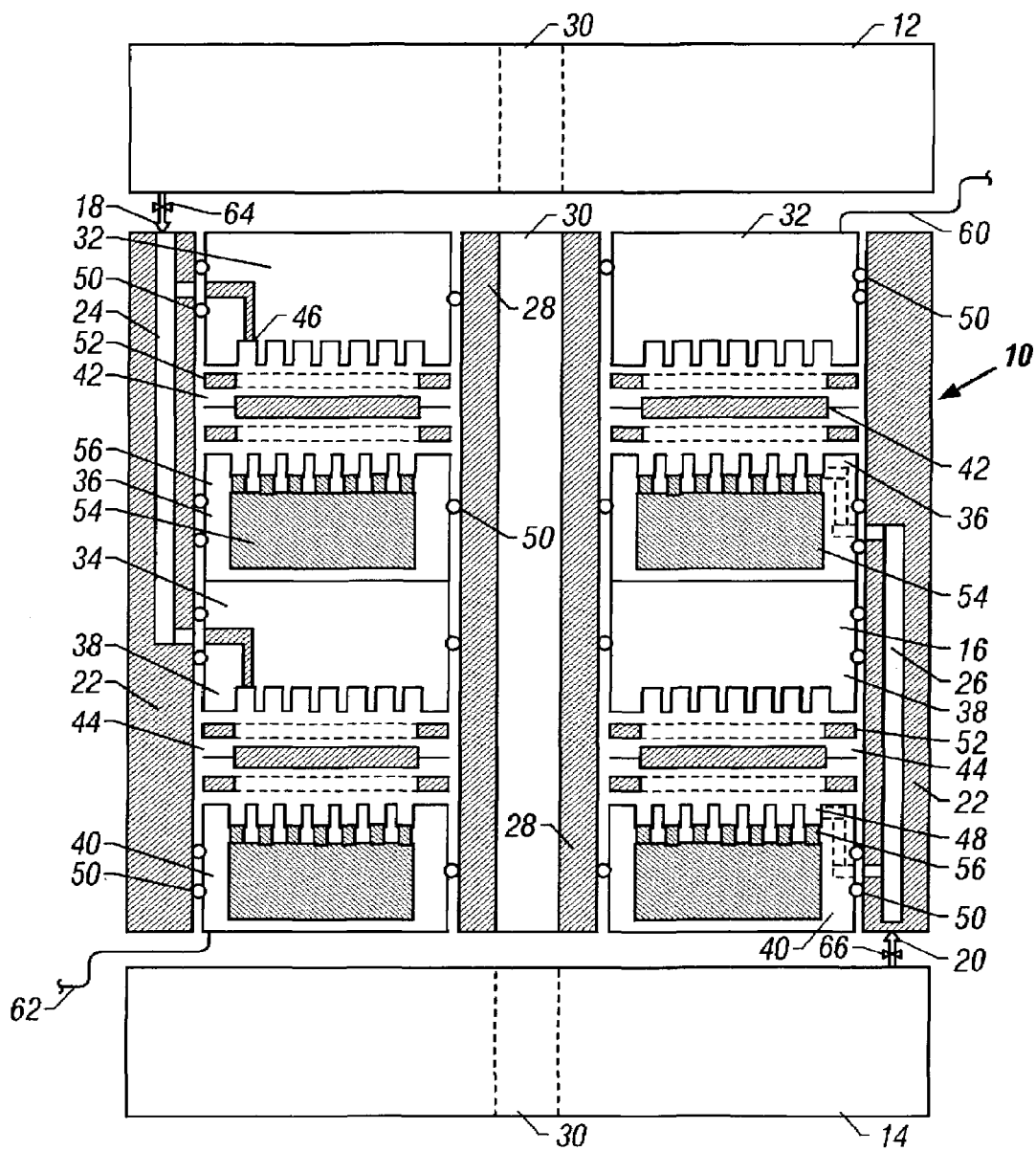
FIG. 1 is a cross-sectional drawing of a fuel cell apparatus of an embodiment of the present invention, comprising two fuel cells in a stack configuration.

FIG. 1 shows one embodiment of the present invention in cross-section. A fuel cell 10 comprises a fuel vessel 12, an oxidant vessel 14, and a reaction zone 16. It should be noted that although a single fuel vessel and oxidant vessel are mentioned throughout this application multiple fuel and oxidant vessels can be adapted for use by one skilled in the art.

The fuel vessel 12 comprises a source of a fuel suitable for use in the fuel cell, such as hydrogen gas or a reformed hydrocarbon. In one embodiment, the fuel vessel comprises a metal hydride. This provides a high-density means for storing hydrogen. Hydrogen gas is released from the solid hydride, and flows through a fuel conduit 18 to the reaction zone 16. Alternatively, the vessel could comprise hydrogen gas under high pressure (e.g., 500 to 5000 psig). Utilizing a metal hydride for hydrogen storage has a number of advantages over a conventional high-pressure gas storage system. The metal hydride can provide more storage capability on a per unit volume basis and the lower pressure metal hydride can provide a safer mode of operation, especially in a high temperature environment. Another alternative fuel providing more storage capability on a per unit volume basis is a chemical such as powerball that reacts with the sea water to generate power. Thus, the size of the fuel reservoir is greatly reduced. The fuel supply to the reaction zone 16 is controlled by a valve 64 that is typically a pressure control valve.

Similarly, the oxidant vessel 14 contains an oxidant, such as air or oxygen gas under high pressure (e.g., 5,000 to 15,000 psig), which flows through an oxidant conduit 20 to the reaction zone. The oxidant supply to the reaction zone 16 is controlled by a valve 66 that is typically a pressure control valve. The valves 64, 66 control the pressure within the reaction zone 16. Since there are fuel and oxidant inlets but no gas outlets from the reaction zone 16, embodiments such as this can be referred to as a closed end reaction zone or a fuel cell having a closed end chamber on the fuel side and the oxidant side. The term closed end chamber is meant to refer to a chamber having a gas inlet, no gas outlet, and optionally having a water outlet.

The fuel cell in this embodiment comprises an outer wall 22 that has a circular cross-section in a horizontal plane. Within this wall are passageways 24 and 26 for fuel and oxidant, respectively. These passageways act as extensions of the fuel conduit 18 and the oxidant conduit 20, and serve to carry fuel and oxidant to the desired sites in or adjacent to the electrodes of the fuel cell.

Figure 10:
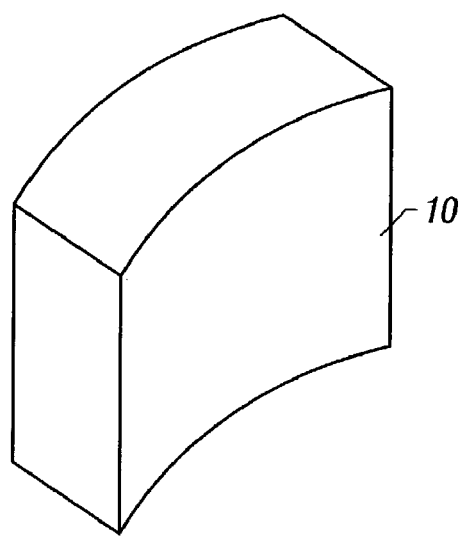
FIG. 10 is an alternative fuel cell shape.

The fuel cell also comprises an inner wall 28, which also has a circular cross-section in a horizontal plane. This inner wall 28 defines an open longitudinal bore 30 through the center of the reaction zone. The fuel vessel 12 and oxidant vessel 14 may also comprise such an open longitudinal bore 30 along their longitudinal axis. Note, however, that the fuel cell may be circular or have any other shape desired. FIG. 10 shows an alternative housing shape which is a portion of an annulus, or arcuate. The housing may have some other shape that facilitates placement of the fuel cell in an annulus.

Within the annular space defined by the outer wall 22 and the inner wall 28 lies the reaction zone 16 of the fuel cell. This reaction zone, in the embodiment of FIG. 1, comprises an anode plate 32, a bipolar plate 34 that comprises a cathode plate portion 36 on one of its sides and an anode plate portion 38 on its other side, and a cathode plate 40. Between each anode and cathode lies electrolyte. The embodiment of FIG. 1 employs proton exchange membranes 42 and 44 as electrolyte. These components may be stacked in various combinations to provide fuel cells with more or fewer reaction zones and membranes.

The fuel conduit 18 can pass through the outer wall 22 and into each anode plate 32 and 38, where it can empty into grooves 46 in the anodes. This allows feeding of fuel to the surface of the anode plates. Similarly, the oxidant conduit 20 can pass through the outer wall 22 and into each cathode plate 36 and 40, where it can empty into grooves 48 in the cathodes.

The reaction zone of the fuel cell may also comprise a plurality of seal members 50, such as O-rings, to seal the electrodes against the outer wall 22 and inner wall 28. In an alternate embodiment the reaction zone may comprise seals, such as fluorocarbon polymer (e.g., Teflon) seal members 52 (e.g., gaskets) between the electrodes and the proton exchange membrane.

The fuel cell also comprises a receptacle for water, optionally located within the fuel cell, so that water need not be pumped or otherwise expelled from the fuel cell housing. In particular, water vessels 54 are located within the cathode plates 36 and 40, and are connected to the surface of each cathode by capillary tubes 56. These tubes 56 allow water formed by the fuel cell reaction to be drawn into the vessels 54, thereby eliminating the need to pump the water to an external disposal site. The elimination of the need to pump the produced water to an external site enables a higher net energy output, since there is no pump required that would consume some of the energy generated. The resulting system is also a simpler system, since there are no required moving parts for water disposal. The water formed by the fuel cell reaction can be drawn into the vessels by capillary action, gravity, or a combination of the two. The capillary effect removes water from the reaction zone without regard to the orientation of the fuel cell stack. This fact can be particularly useful for applications within wellbores that are deviated from vertical, such as in horizontal laterals.

The totally enclosed design results in highly efficient fuel and oxidant usage, since the reactants, typically H2 and O2, remain within the fuel cell stack until they are consumed in the reaction and only the reaction product (H2O) is removed from the reaction zone.

It should be noted that in alternative embodiments wherein the location or application of the fuel cell dictates size constraints on the water reservoir, a pump can be provided therein to remove water.

Figure 12:
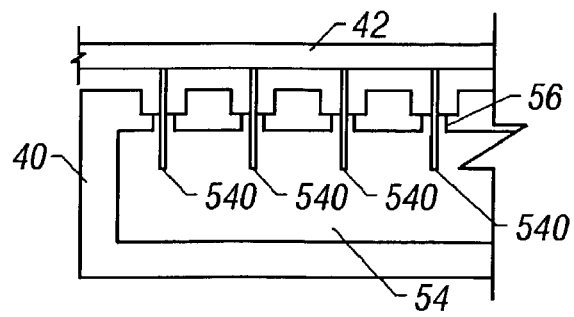
FIG. 12 a side elevational, cross sectional view showing the capillary members leading into a reservoir.

FIG. 12 schematically shows how the capillary member 540, which may be a tube or thread or other similar device, extends from a position proximal the surface of the membrane or touching the membrane to the reservoir. Although the water receptacle vessels 54 are shown located in the cathode plates in FIG. 1, it should be understood that they could be located elsewhere in the apparatus as well. The water vessels 54 may comprise a material that will absorb water. A water absorbing material can act to draw the water from the capillary member and thus enhance the removal of the produced water from the reaction zone. A water absorbing material can also act to bind the water and restrict the water from possibly migrating out of the water receptacle vessel 54 in some manner.

In the embodiment shown in FIG. 1, the outer wall 22 of the fuel cell encloses the electrodes and electrolyte, but not the fuel and oxidant storage vessels 12 and 14. It would also be possible to have the outer wall enclose the fuel and oxidant storage vessels 12, 14 as well. This design would make the entire apparatus totally enclosed within a single housing and having only the electrical conductors 60 and 62 extending beyond the housing, these being used for conducting the electrical power generated by the fuel cell to an external device. Examples of external devices that can be powered by fuel cells include wireline tools, measurement while drilling (MWD) instruments, downhole remote telemetry equipment, downhole sensors, intelligent control and monitoring units, and the like.

In operation, a fuel pressure regulator valve 64 located in the fuel conduit 18, and an oxidant pressure regulator valve 66 located in the oxidant conduit 20, control the pressure of fuel and oxidant in the reaction zone 16. These valves 64 and 66 are adjusted such that a relatively high pressure, ranging from about 40–400 psig, most typically about 50–200 psig, is maintained in the reaction zone. The pressure in the reaction zone is static during operation (e.g., the pressure varies no more than about 5%, and may stay unchanged). The temperature may range from about 0–150° C., more typically from about 0–120° C. Operating the fuel cell at a relatively high pressure assists in the condensing of the byproduct water, typically produced in the form of steam, into a liquid phase that can be removed from the reaction zone as discussed above. The condensing and removal of the produced water maintains a constant partial pressure of the fuel and oxidant which enables the reaction to continue.

Although the present invention can make use of different types of fuel cells, such as phosphoric acid fuel cells and alkaline fuel cells, it is also possible to use proton exchange membrane fuel cells. The anodes and cathodes in such proton exchange membrane fuel cells can be made by applying a small amount of platinum black to one surface of a thin sheet of porous, graphitized paper. The membrane is often sandwiched between the anode and cathode and the three components sealed together under heat and pressure to produce a single "membrane/electrode assembly." The proton exchange membrane may be made from a polymer such as NAFION (available from Dupont). The anode and cathode are typically contacted on the back side by flow field plates made of graphite in which channels have been formed. The channels supply fuel to the anode and oxidant to the cathode. Hydrogen from the fuel gas stream is consumed at the anode, yielding electrons to the anode and producing hydrogen ions, which enter the membrane. At the cathode, oxygen combines with electrons from the cathode and hydrogen ions from the membrane to produce water.

The present invention is especially well adapted for use with proton exchange membrane fuel cells. Embodiments of the invention can operate at an elevated temperature and pressure environment within the reaction zone. The temperature can operate, for example, within the range of 80° C. to 130° C. The pressure can range from atmospheric up to in excess of 400 psi, but will typically range from about 50–100 psi. The higher operating pressure keeps the membrane from dehydrating at the high operating temperature by keeping the pressure above the phase equilibrium curve. In this manner the pressure will be somewhat higher than needed for a saturated water vapor phase, thus maintaining a water vapor phase to keep the membrane hydrated while the excess pressure, supplied by the fresh oxidant, assists in condensing liquid water that can be removed from the reaction zone while also providing oxygen for the reaction to proceed. For example, at a temperature of 100° C. and atmospheric pressure (approximately 15 psi), the boiling point of water, there would be saturated steam and no driving force for the fuel cell reaction, thus the fuel cell in these conditions would fail to generate power in a closed system fuel cell. However at 100° C. and an elevated pressure, say 25 psi, in a closed system having a liquid water containment vessel, there would be sufficient water vapor to keep the membrane hydrated, and the excess 10 psi of pressure from the supplied oxygen would assist in condensing a portion of the produced water vapor that could be removed from the reaction zone, in addition to supplying a driving force and source of oxidant for the fuel cell reaction to take place.

The pressure regulators on the fuel and oxidant supplies control the operating pressure on their respective sides of the membrane. The temperature and pressure controls allow a balance to be met that allows the membrane to stay hydrated while also enabling the condensation of the water vapor and the liquid water removal from the reaction zone. The closed end nature of the fuel cell, where the fuel and oxidant supply each have an inlet to the reaction zone but there is no gas outlet from the reaction zone, allows the operation at elevated pressures. The only outlet from the reaction zone is the outlet to remove produced water to the water containment vessel. If produced water is not removed from the reaction zone, the water will build up and the fuel cell would not be able to work. If the membrane were to become dehydrated, the fuel cell would fail because the membrane must be wet to operate. In a particular embodiment of the proton exchange membrane fuel cell, the electrolyte between the anode and cathode comprises a polymer material.

Figure 15:
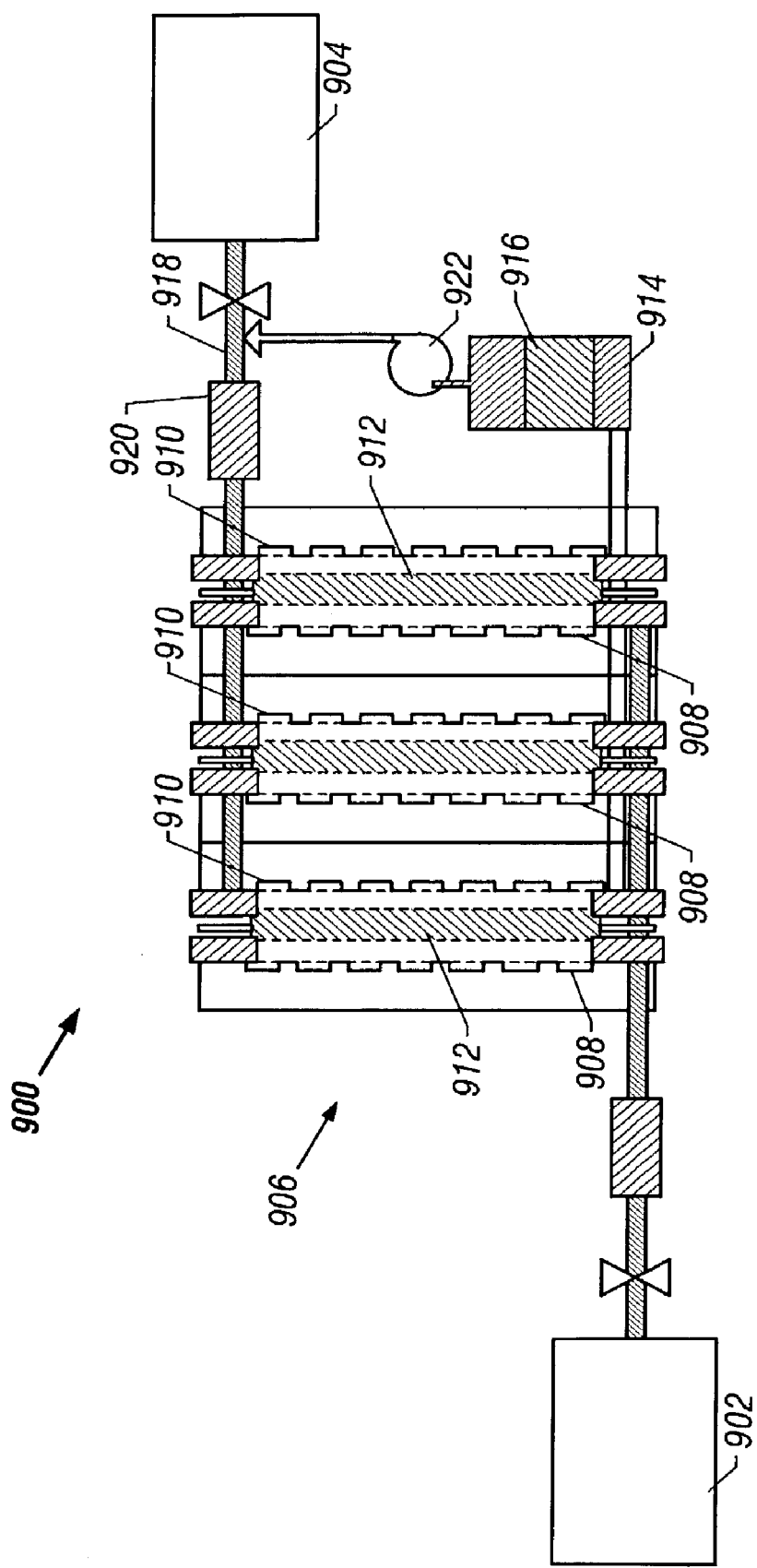
FIG. 15 is an illustration of an embodiment of a proton exchange membrane fuel cell.

FIG. 15 is an illustration of an embodiment of a proton exchange membrane fuel cell. In the proton exchange membrane fuel cell, shown generally as 900, a fuel vessel 902 and an oxidant vessel 904 are in communication with a reaction zone 906. The reaction zone 906 shown comprises three anodes 908 and three cathodes 910 separated by the proton exchange membrane 912. Water is produced is on the cathode 910 side, so the water vessel 914 can be in communication with the cathode/oxygen 910 section of the cell. Shown is a common water vessel 914 that can receive produced water from all three cathode 910 sides of the membrane 912. Water scrubber materials 916 can be used within the water vessel 914 to facilitate the separation of the oxygen from the produced water of the proton exchange membrane fuel cell 900. The oxygen gas that is separated from the produced water can then be added to the oxidant stream 918 supplying the fuel cell reaction zone 906. The recycled oxygen gas is shown being added to the oxidant stream 918 upstream of a check valve/regulator 920 that prevents backflow from the reaction zone 906. A pump 922 may be required to achieve the recycled oxygen gas flow into the oxidant stream 918. The recycled oxygen can also be added to the oxidant stream 918 downstream of the check valve/regulator 920 such that it operates to induce an internal circulation means for the oxygen side of the membrane 912. In some embodiments of the proton exchange membrane fuel cell a greater power output can be obtained by having an internal circulation means for the oxygen.

In proton exchange membrane fuel cells that run on fuel other than pure hydrogen gas, a problem exists with carbon monoxide, CO, build up within the fuel side of the membrane. The CO can be absorbed onto the platinum powder that is within the electrode, and can result in effectively blocking the reaction. This problem is apparent in fuel cell applications such as, for example, in vehicles or commercial power generation that are fueled with hydrocarbon sources. The CO problem is especially noticed in fuel cells operating at atmospheric or near atmospheric pressures (pressures within about 10 psi of atmospheric) and at lower operating temperatures (less than about 100° C.). At elevated temperatures, such as for example, above 100° C., the rate of absorption of CO onto the platinum has been observed to be less. The present invention, due to the closed end operation, can operate at temperatures and pressures that are higher than those just mentioned. Therefore, embodiments of the present invention can operate with less of a tendency to be harmed by CO impurities in the fuel stream.

Certain embodiments of the invention can be used, for example, to power an electric vehicle having a hydrocarbon fuel source. Operating at elevated temperature and pressure as mentioned above, the fuel cell would have a reduced tendency for CO fouling. Being a closed end system, (having fuel and oxidant inlet, but only water outlet from the reaction zone), the CO that is present in the fuel will collect within the reaction zone. The CO that builds up within the reaction zone can be vented at periodic intervals in a controlled manner so as to maintain the desired pressure within the reaction zone. The produced water can be collected within a water containment vessel as described elsewhere in this application and the water can also be drained in a controlled manner to so as not to have water storage capacity become a restriction upon the longevity of the fuel cell life.

Yet another type of fuel cell that can be utilized with the present invention is a solid oxide fuel cell. The solid oxide fuel cell uses a ceramic, solid phase electrolyte that reduces corrosion considerations and eliminates the electrolyte management problems associated with the liquid electrolyte fuel cells. A ceramic material that can be used for this application is dense yttria-stabilized zirconia, which is an excellent conductor of negatively charged oxygen (oxide) ions at high temperatures. In order to achieve adequate ionic conductivity in such a ceramic, the system must operate at elevated temperatures, such as about 650 degrees C. or higher. The anode can be, for example, a porous nickel/zirconia cermet while the cathode can be, for example, a magnesium-doped lanthanum manganate. Numerous individual cells can be connected together by high temperature semiconductor contacts to increase the power output. The solid oxide fuel cell is not restricted by operating pressure within the fuel cell and can operate in, for example, operating pressure ranges from atmospheric to in excess of 400 psi. The ability to operate with a high operating pressure can be beneficial in designing the fuel cell for high temperature/high pressure applications.

In operation, hydrogen in the fuel stream reacts with oxide ions from the electrolyte to produce water and to deposit electrons into the anode. The electrons pass outside the fuel cell, through the load, and back into the cathode where oxygen from the oxidant source receives the electrons and is converted into oxide ions, which enter the electrolyte. The higher operating temperatures of a solid oxide fuel cell, for example 650° C.–1,000° C., enables the use of this type cell in even the most extreme high temperature well applications. Of course thermal insulation will be needed with a solid oxide fuel cell to protect the equipment and surrounding environment and to maintain the high temperature within the fuel cell required for its use.

Figure 13:
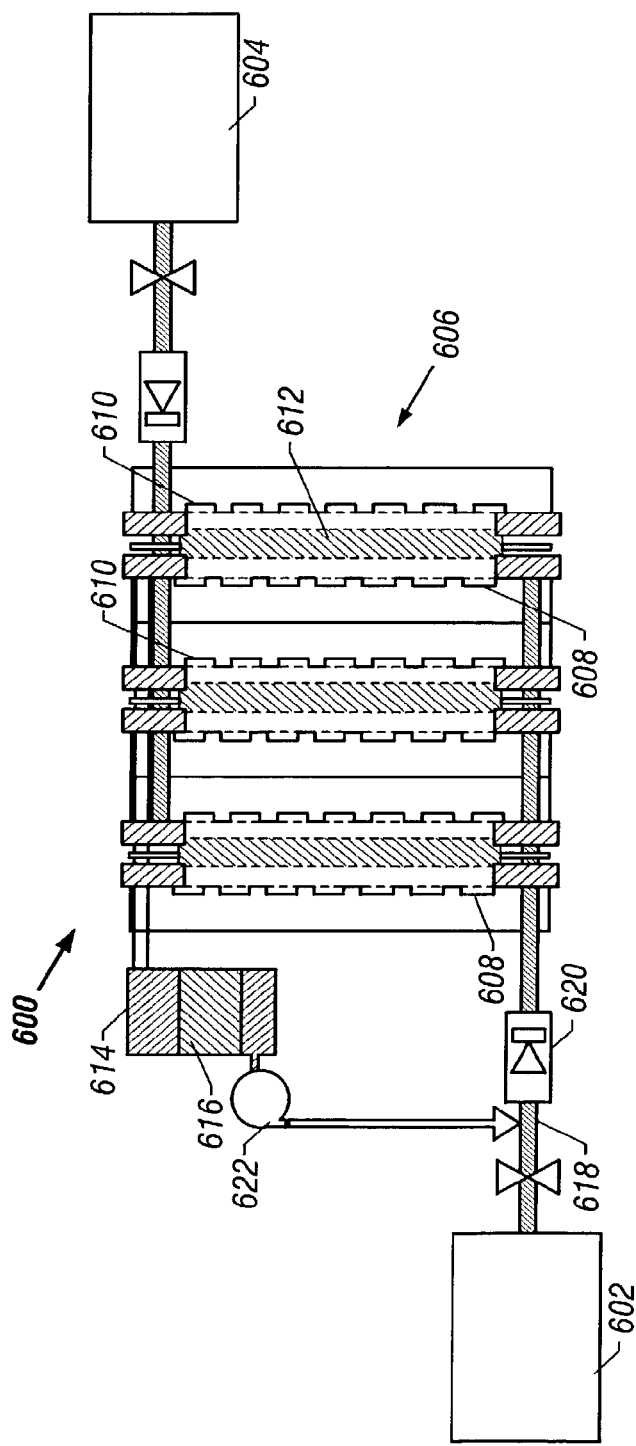
FIG. 13 is an illustration of an alternate embodiment of the invention comprising a three-cell fuel cell.

FIG. 13 is an illustration of an embodiment of a solid oxide fuel cell. In the solid oxide fuel cell, shown generally as 600, a fuel vessel 602 and an oxidant vessel 604 are in communication with a reaction zone 606. The reaction zone 606 shown comprises three anodes 608 and three cathodes 610 separated by the ceramic, solid phase electrolyte 612. Water is produced is on the anode 608 side, so the water vessel 614 can be in communication with the anode/hydrogen 608 section of the cell. Metal hydride 616 can also be used as a means of regenerating hydrogen from the produced water of the solid oxide fuel cell 600. Metal hydride material 616 contained within the receptacle of the produced water 614 can react with water and produce hydrogen gas, as shown in the simplified equation MH+H2O→H2+MOH, where MH stands for metal hydride and MOH stands for metal hydroxide. The hydrogen gas that is released can then be added to the fuel stream 618 supplying the fuel cell reaction zone 606. The regenerated hydrogen gas is added to the fuel stream 618 upstream of a check valve 620 that prevents backflow from the reaction zone 606. A pump 622 may be required to achieve the regenerated hydrogen gas flow into the fuel stream 618.

The ability to regenerate a portion of the fuel from the produced water has beneficial results. The quantity of produced water that is required to be stored can be less and the quantity of original fuel that is required can be reduced. These results enable a smaller fuel cell apparatus to be used for a given quantity of energy produced or a set duration of fuel cell life at a known load. The solid oxide fuel cell can operate with internal temperatures ranging from about 650° C. to over 1,000° C. and with the proper insulation can operate within environments that includes the temperature range of 0° to 1,000° C. which would cover almost any wellbore environment. The ability of this embodiment to be used in such a broad range of temperature environments can be useful, as the temperature of the particular application would not be a detriment to using the solid oxide fuel cell.

Various embodiments of the present invention are able to operate in temperatures ranging from about 80 degrees C. (proton exchange membrane fuel cell) to in excess of 1000 degrees C. (solid oxide fuel cell). This ability to modify the invention to cover virtually all temperature ranges is useful when designing a particular application and considering factors such as the application temperature and the ability to discharge heat that is generated during the fuel cell operation.

Although the apparatus of the present invention can comprise a single fuel cell, alternate embodiments can employ a plurality of fuel cells in a stack configuration as shown in FIG. 1. It is also possible to include bipolar plates in such a stack, whereby one side of the bipolar plate serves as the cathode for a first fuel cell and the other side of the bipolar plate acts as the anode for a second, adjacent fuel cell.

The cylindrical housing and open longitudinal bore depicted in FIG. 1 are especially useful when the fuel cell apparatus is to be used downhole in an oil or gas well, or in a subsea location adjacent to an offshore well. The cylindrical shape allows the apparatus to conform to the space available inside well casing or tubing, or inside a riser pipe of an offshore platform. The open longitudinal bore allows space for cable or downhole tools to pass up or down therethrough, without interfering with the operation of the fuel cell. An annular design of the fuel cell can also allow produced fluids to flow through the longitudinal bore. This fluid flow can be useful in assisting in the removal of heat generated within the fuel cell. The fuel cell may include other passageways therethrough, such as control line passageways that facilitate the routing of lines through the fuel cell to equipment mounted below the fuel cell.

Figure 2:
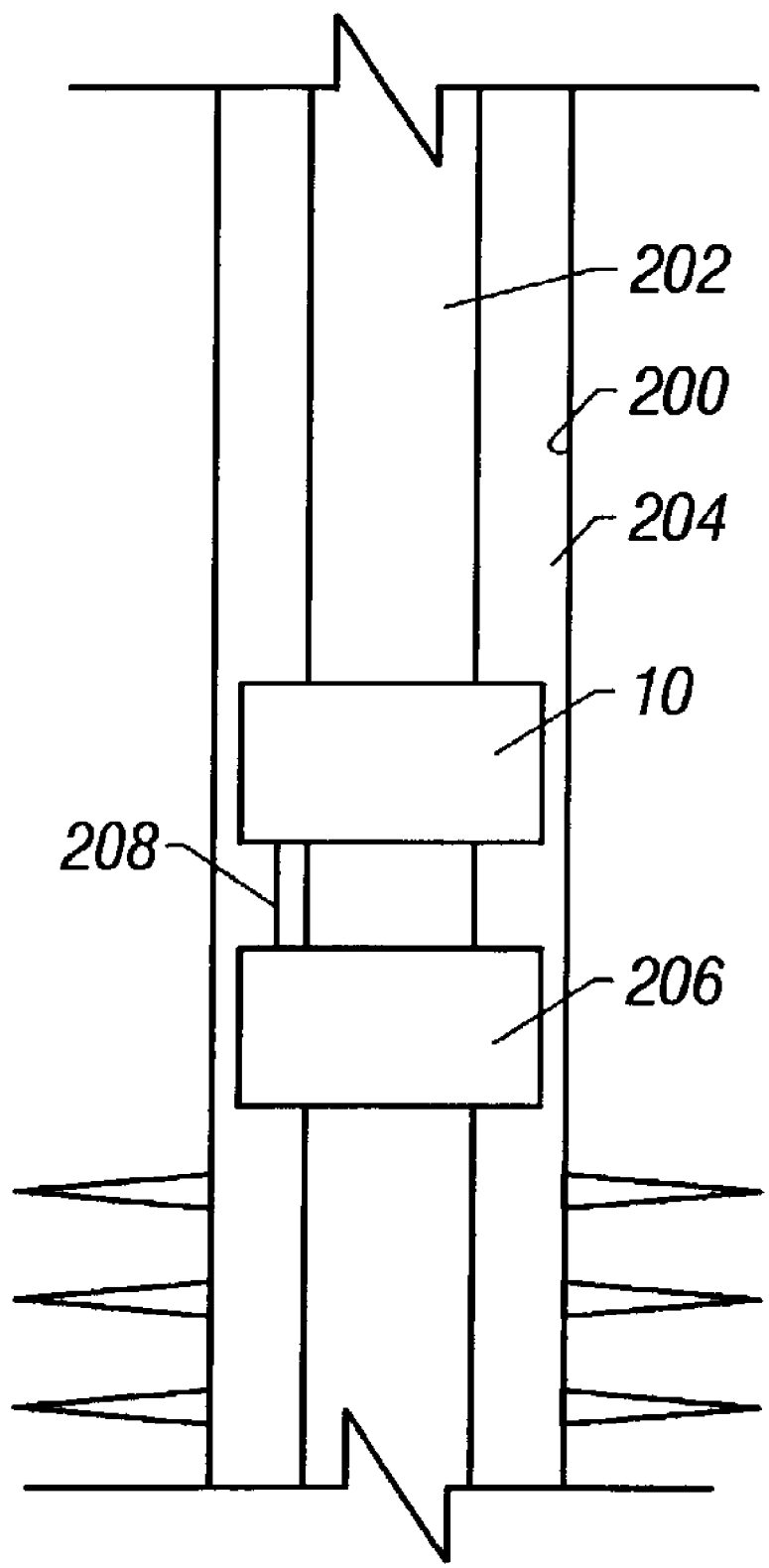
FIG. 2 is a schematic drawing showing a fuel cell in a wellbore.

FIG. 2 is a schematic diagram showing a fuel cell 10 in a well 200. A tubing string 202 extends into the well 200. The fuel cell is positioned in the well, would typically be attached to a tubing string and primarily residing in the annular space 204 between the production tubing and the well (which may include casing, a liner, or be open hole). Note that the fuel cell may also be used in wells that do not contain a tubing string. The fuel cell is in electrical communication with downhole equipment 206 such as by a communication line 208. As discussed, the downhole equipment may comprise any equipment positioned downhole that is capable of utilizing or that requires electricity. The heat generated by the fuel cell may also be used in some downhole environments (as in highly viscous, cool environments) and the downhole equipment includes devices that may use the generated heat.

Figure 3:
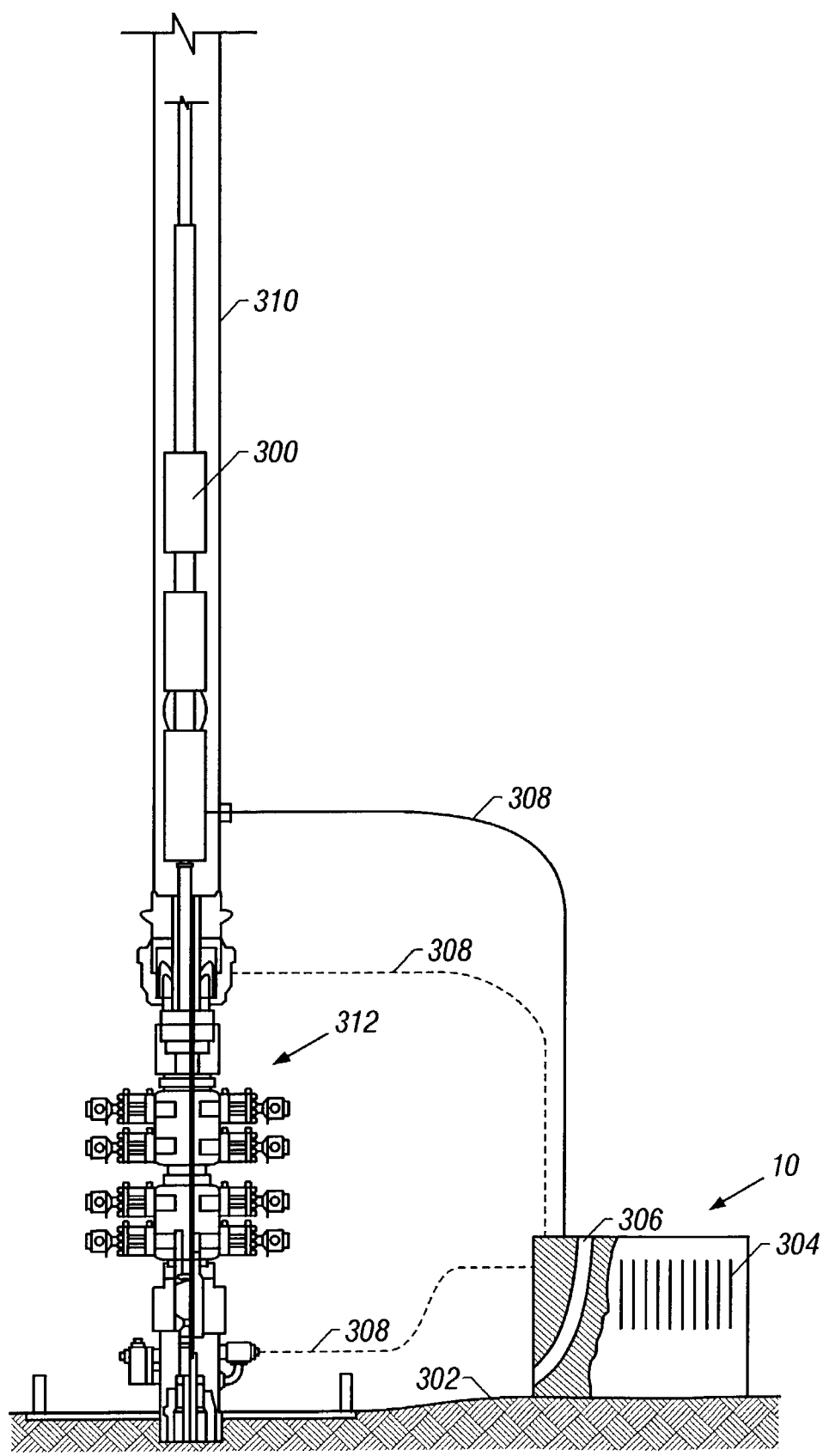
FIG. 3 is a schematic drawing showing a fuel cell positioned proximal a wellhead at the sea floor.

FIG. 3 shows an alternative embodiment in which the fuel cell is positioned near the sea floor 302 and connected to subsea well equipment 300 to power the equipment. In this embodiment the fuel cell is positioned external to the well. Placing the fuel cell outside of the wellhead allows the fuel cell to utilize the sea water to dissipate the heat generated by the fuel cell. Placing the fuel cell external to the well and utilizing the sea water to dissipate the heat from the fuel cell allows the fuel cell to achieve a greater power output because the heat generation and operating temperatures are better controlled than in a downhole environment.

Figure 5:
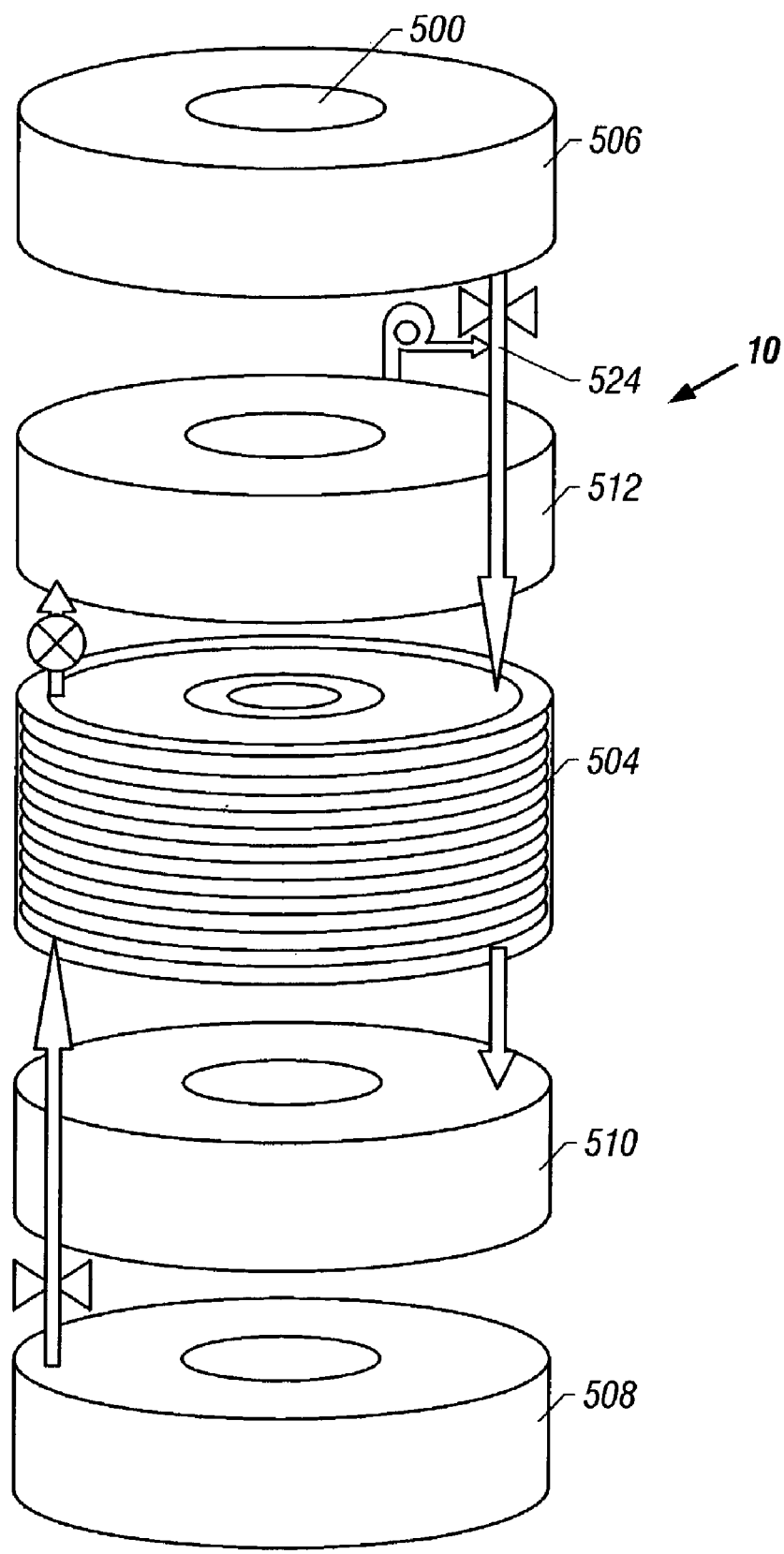
FIG. 5 is an exploded schematic of an alternative fuel cell.

To facilitate dissipation of the heat from the fuel cell, the fuel cell may incorporate various features, such as fins 304, circulating pumps (not shown), and flow passageways 306 through the fuel cell. In one embodiment, the fuel cell defines generally vertically-extending passageways 306 that are open to the sea at or near the top and the bottom. The cool sea water enters the passageway through the bottom end and rises as the fuel cell heats the sea water. The warmed sea water exiting the top end carries heat from the fuel cell, cooling the fuel cell. The vertical passageway could be an axial passageway 500 such as that shown in FIG. 5.

As shown in FIG. 3, the fuel cell 10 is electrically connected to the well equipment within the well or the riser via an electrical conductor 308 extending from the fuel cell, through the riser 310 or wellhead 312, and to the equipment. The equipment powered may be any type of equipment desired as discussed herein. Alternative paths for the routing of the electrical conductor 308 are shown as dashed lines also labeled 308.

Figure 4:
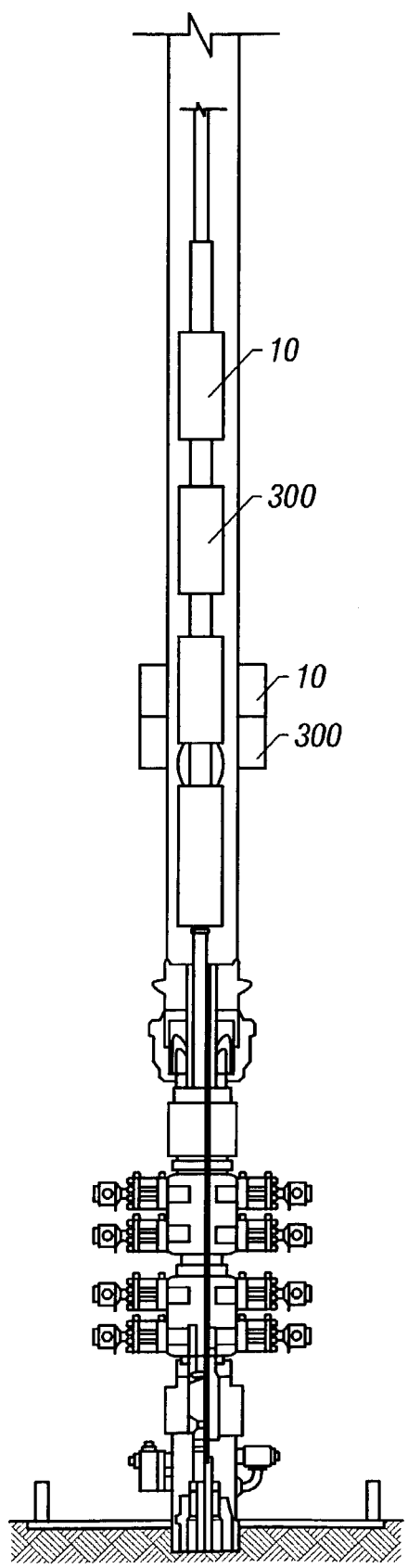
FIG. 4 is a schematic drawing showing a fuel cell positioned in a riser.

FIG. 4 shows another alternative embodiment in which the fuel cell 10 is placed in the subsea riser 310. This embodiment is similar to that of the downhole fuel cell in that the overall shape of the fuel cell is annular (or shaped to fit in an annulus) and defines a passageway therethrough or thereby that allows tools to pass through the riser, past the fuel cell, and into the well. Accordingly, the cross-sectional shape of the fuel cell could be annular, arcuate, or a portion of an arcuate shape (such as shaped like an arc) so that the fuel cell may fit within an annulus or otherwise reside outside of the well tool passageway (See FIG. 10). Note that cylindrical fuel cells may be useful in certain circumstances in the riser or downhole.

The embodiment of FIG. 4 may incorporate cooling passageways (not shown) therethrough to facilitate heat removal. The passageways may be plumbed to openings in the riser to allow seawater to flow into the riser, through the fuel cell cooling passageways, and back out of the riser into the sea. This flow may be accomplished using pumps or the natural tendency of the warmed seawater to rise or other mechanisms.

FIG. 4 also shows a fuel cell 10 connected to an exterior of a subsea riser 310. In the embodiment shown, the fuel cell 10 powers equipment 300 positioned outside the riser 310. The fuel cell and equipment may be annular or have some other shape that facilitates their attachment to the exterior of the riser 310. The fuel cell mounted to the exterior of the riser may also be used to power equipment within the riser with the appropriate electrical connections and may incorporate the cooling features previously mentioned in connection with the embodiment of FIG. 3.

FIGS. 5 through 8 disclose one possible embodiment of the fuel cell 10 for subsea or downhole use. The fuel cell comprises a fuel cell stack 504 as previously described, an oxygen supply 506, a hydrogen supply 508, and two water reservoirs (510, 512). As previously discussed, the oxygen and hydrogen supplies communicate with opposite sides of the fuel cell membranes.

One of the reservoirs, the first reservoir 510 is positioned below the fuel cell stack. At least a portion of the water produced in the reaction drains to the lower reservoir by action of gravity and capillary action.

Figure 8:
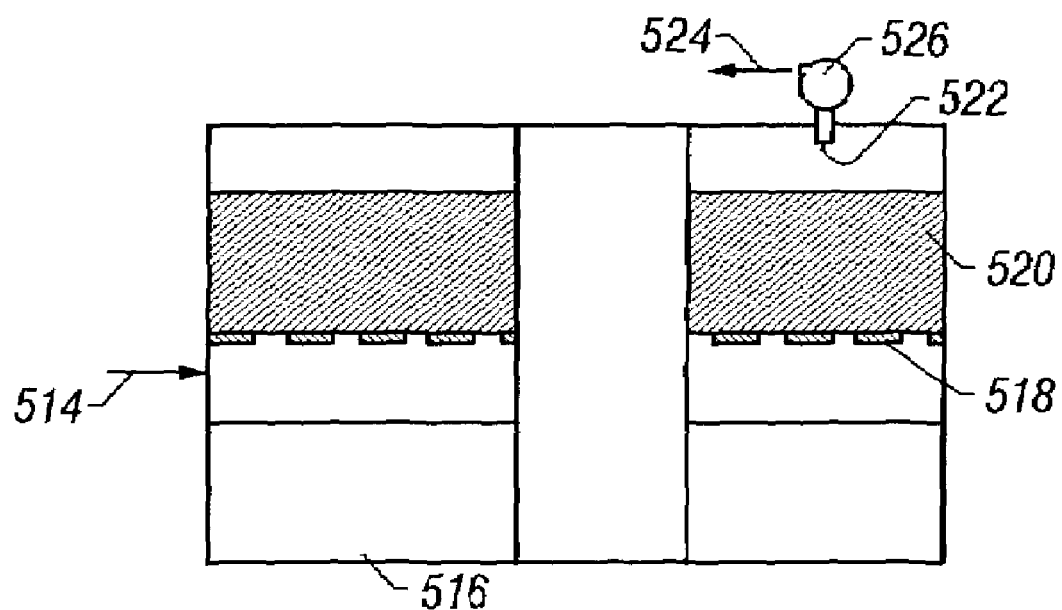
FIG. 8 is a schematic view of a second reservoir.

The second reservoir 512 is in fluid communication with the oxygen sides of the membranes with a check valve in the communication line to prevent flow from the reservoir to the fuel cell stack. FIG. 8 is a schematic diagram of the second reservoir. Steam, or wet oxygen, from the fuel cell stack enters the second reservoir via an inlet 514 at a position intermediate an internal water reservoir 516 and a filter screen 518, such as a stainless steel screen. The screen supports a desiccant 520 adapted to absorb water and other materials from the wet oxygen. An outlet 522 of the second reservoir, positioned on an opposite side of the desiccant from the inlet, communicates with the oxygen supply line 524 to the fuel cell stack. A pump 526 in the line between the outlet and the oxygen supply facilitates movement of the oxygen from the second reservoir to the fuel cell stack. In this way, water generated in the reaction is removed from the fuel cell stack. The first reservoir 510 and the second reservoir 512 can be adapted to serve as common reservoirs that are shared by numerous fuel cell stacks, the fuel cell stacks being combined to form a single power supply.

Figure 7:
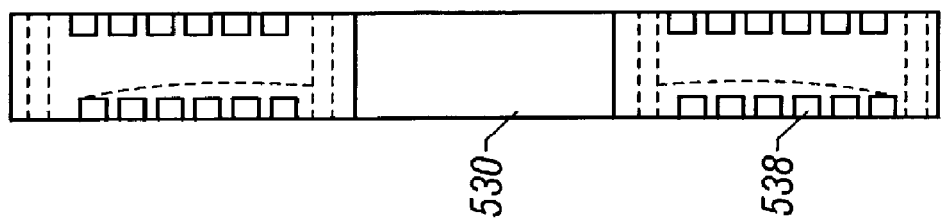
FIG. 7 is a side elevational view of a plate of a fuel cell.
Figure 6:
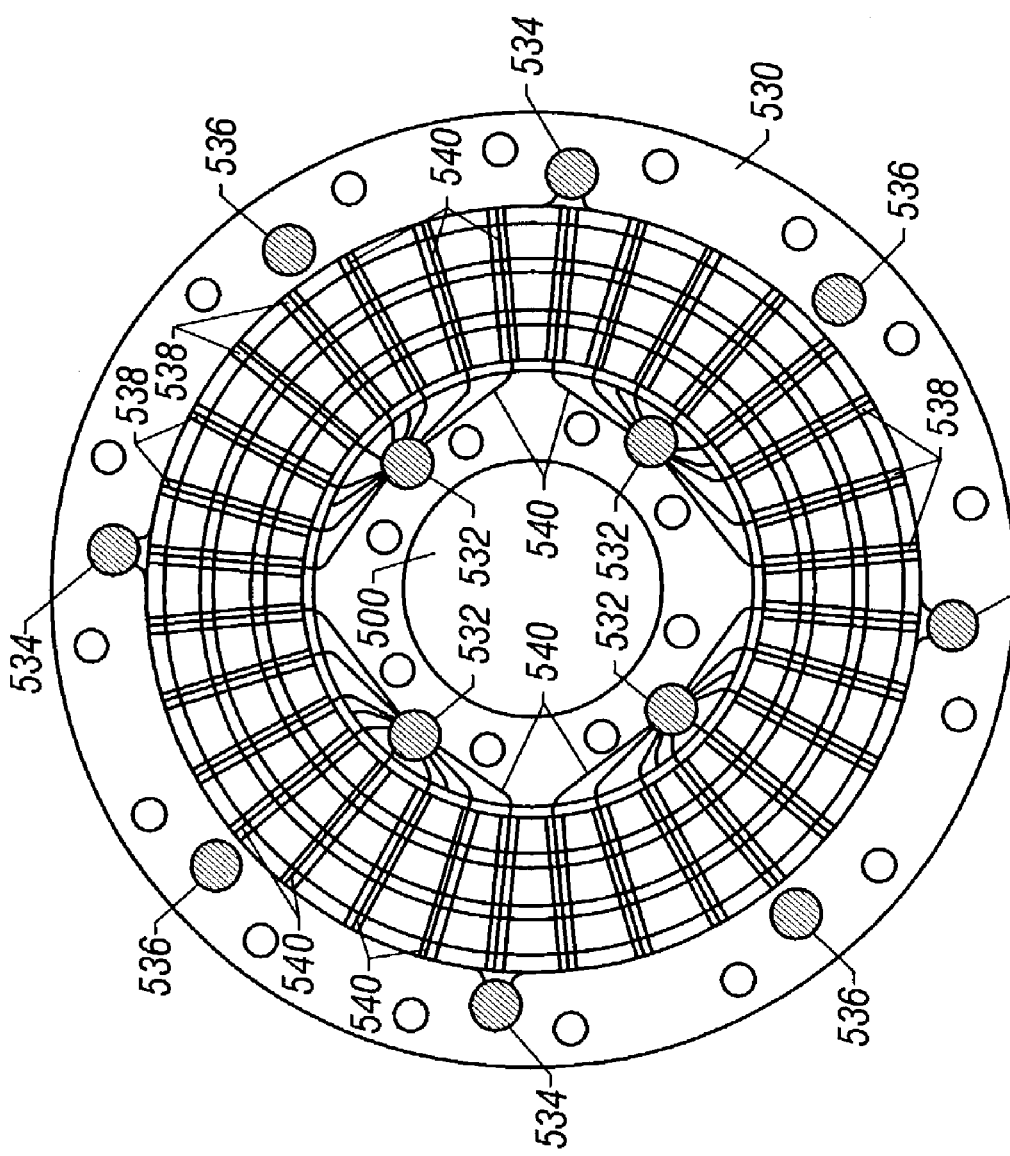
FIG. 6 is a top elevational view of a plate of a fuel cell.

To further facilitate water removal from the fuel cell stack, the anode plates 32, bipolar plates 34, and cathode plates 40 (referred to collectively as plates 530), include drain holes 532 communicating with at least one of the reservoirs. FIGS. 6 and 7 show a top (oxygen side) view and side view respectively of a representative plate. The plate has a plurality of spaced passageways for oxygen and hydrogen inlets (534, 536). A set of oxygen and water drain outlets 532 also extend through the plate and communicate with the reservoirs described above. The outlets can be positioned proximal the center of the plate as shown in the figure. Radial channels 538 formed in the plate facilitate movement of water on the surface of the plate toward the outlets. To further facilitate movement of the water, the channels or other portions of the plate may be coated with a hydrophobic material such as wax or grease. Capillary members 540, such as threads, may be placed in the radial channels and into the outlet to further facilitate movement of the water from the channel to the outlet.

Figure 9:
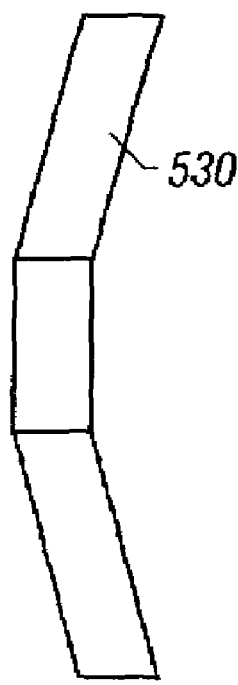
FIG. 9 is a side elevational view of a plate of a fuel cell.

The plate shown in FIG. 9 includes an additional modification to facilitate movement of the water to the outlets, namely a sloped, slanted, or angled surface. By using a frustoconical, conical, hemispherical, bowl-shaped, curved, or a surface that otherwise descends toward the outlets, gravity aids movement of the water (liquid) on the surface of the plate toward the outlets. FIG. 7 shows a plate in which only the surface having the radial channels is sloped.

Figure 11:
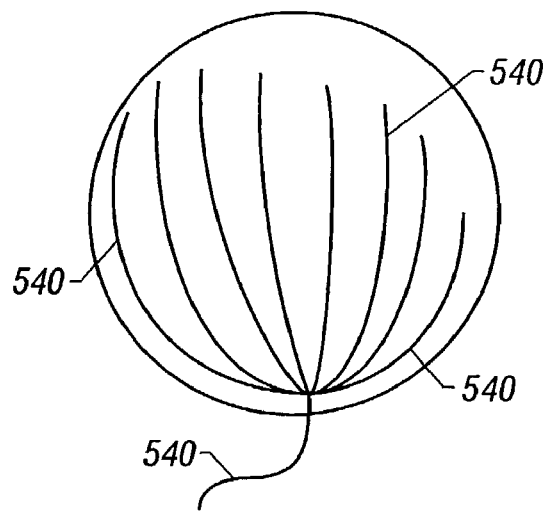
FIG. 11 is a top elevational view of an alternative membrane with capillaries thereon.

FIG. 11 discloses an alternative embodiment in which the capillary members are formed on the surface of the membrane. The capillaries radiate from one, or more, points that has a capillary member 540 which extends away from the surface to direct the water from the membrane surface to a water reservoir.

Figure 14:
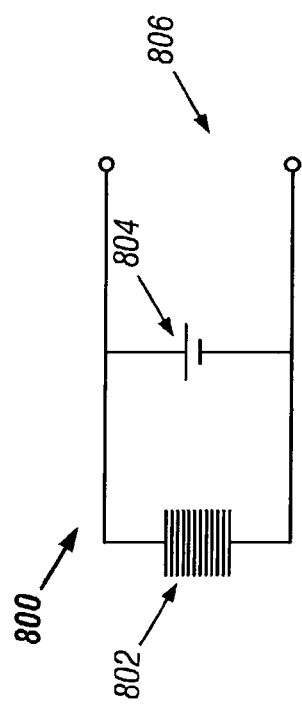
FIG. 14 is a simplified electrical schematic illustrating a fuel cell/battery hybrid power supply.

FIG. 14 shows one embodiment of the present invention as a hybrid power system shown generally as 800 comprising a fuel cell 802 and a rechargeable battery 804 that are electrically connected to provide power across a load 806. This combination can be adapted to be utilized in a downhole application. When coupled with a battery 804, the fuel cell 802 does not need to generate the maximum power output required for a short duration peak load. This hybrid system 800 is particularly suitable for multiple level power consumption requirements where a majority of time an average base level power requirement is needed and a relatively small amount of time there is a short-term peak power load. The rechargeable batteries 804 can be charged by the fuel cell 802 during the average power consumption periods and can be used to boost the output power during the high power consumption periods.

The hybrid system 800 may be able to reduce the size, weight and cost of the total power system by enabling a smaller fuel cell 802, in conjunction with a battery 804, to provide a required power demand 806.

Figure 16:
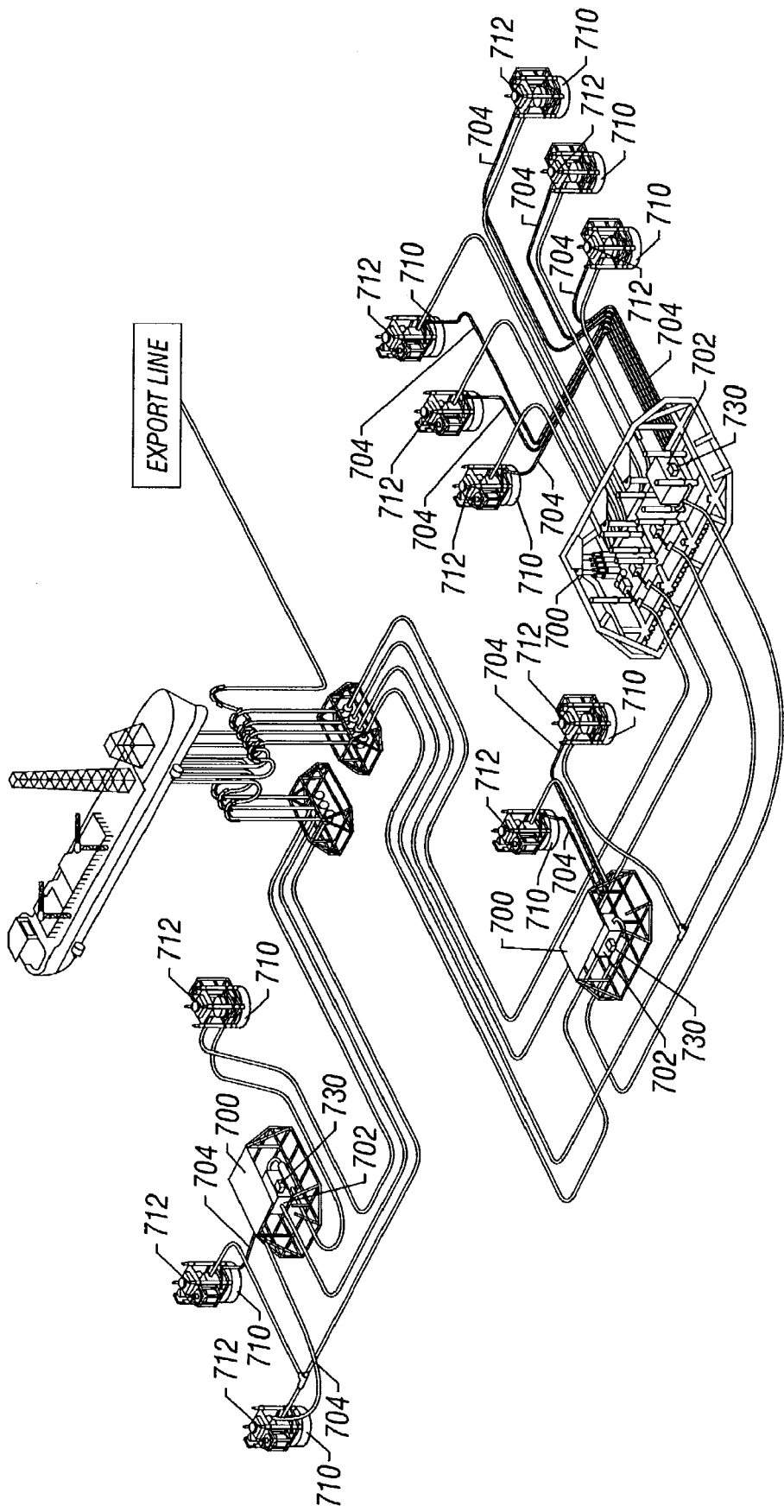
FIG. 16 is an illustration of a subsea field powered by fuel cells.

FIG. 16 is illustrative of the present invention used to advantage in a typical subsea field. In a typical subsea field, the production manifolds 700 act as distribution units for oil/gas production, water injection, chemical injection, electrical power, hydraulic power, and communications, for example. The production manifolds 700 control and power the individual subsea wellheads 710, production trees 712, and associated equipment to facilitate production delivery to the surface for processing.

Figure 17:
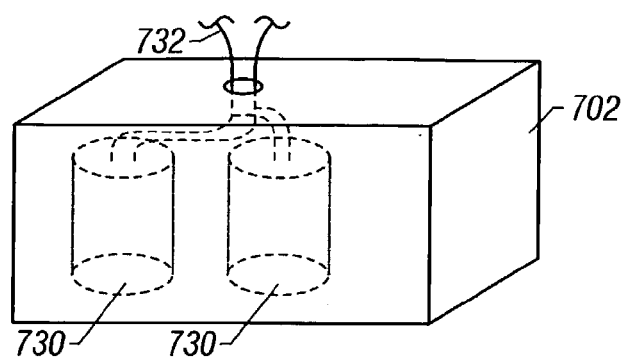
FIG. 17 is an enlarged view of a housing for one or more fuel cells.

In an embodiment of the present invention, the production manifolds 700 are powered by one or more fuel cells 730. The power supplied by the one or more fuel cells 730 is then distributed by the production manifolds 700 to the subsea wellheads 710, production trees 712, and seabed equipment including, but not limited to, hydraulic pump motors, booster pumps, communication transmitters, downhole feedthroughs to the well instrumentation and intelligent completions, and downhole tools. The power is distributed from the production manifolds 700 through distribution lines 704. In one embodiment, the one or more fuel cells 730 supplying power to the production manifolds 700 are located within a manifold power supply housing 702. An enlarged view of an embodiment of a manifold power supply housing is shown in FIG. 17. Power is distributed to the production manifold 700 through electrically conductive communication lines 732. The manifold power supply housing 702 can be affixed to the production manifold 700 or located externally.

Depending upon the life of the field, the fuel cells 730 may need to be replaced or replenished periodically. In the embodiment shown in FIG. 17 wherein the one or more fuel cells 730 are located within the manifold power supply housing 702, once the one or more fuel cells 730 have exhausted their resources (oxidant and fuel supply) to generate power, or for periodic maintenance, the fuel cells 730 are replaced. Replacing the fuel cells 730 is accomplished by divers, remote operated vehicles (ROVs), or autonomous underwater vehicles (AUVs), for example.

Figure 18:
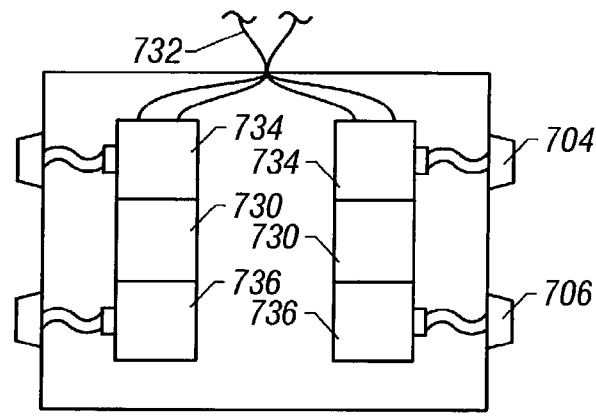
FIG. 18 is illustrates a housing through which the fuel cell energy resources are replenished.
Figure 19:
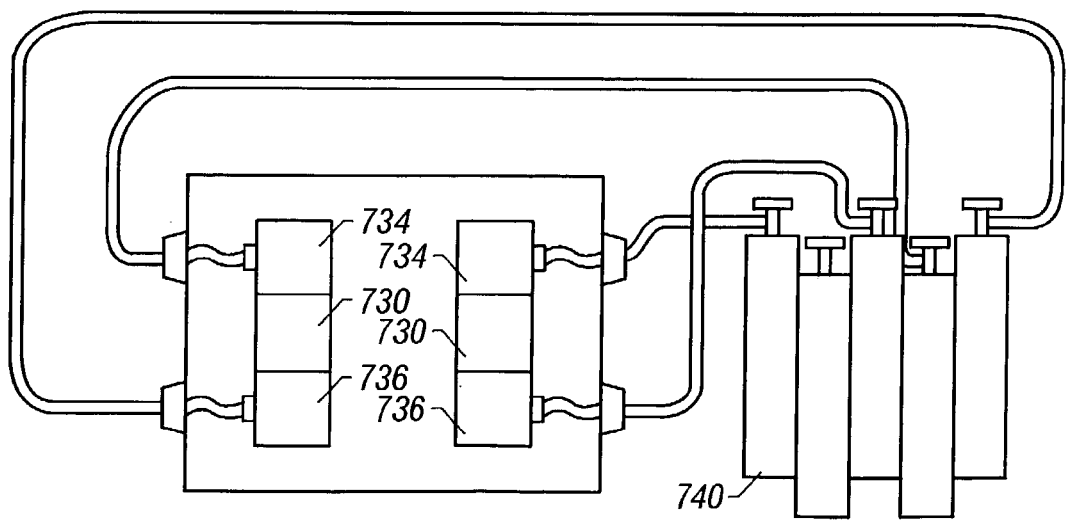
FIG. 19 is a illustrates a housing through which fuel cell energy resources are provided from a bottle/tank.

In an alternate embodiment shown in FIG. 18, once the one or more fuel cells 730 have exhausted their resources, or for periodic maintenance, the oxidant reservoirs 734 and the fuel reservoirs 736 are replenished. As shown, the oxidant reservoirs 734 are in communication with a supply valve 704 located on the outside of the power supply housing 702. Similarly, the fuel supply reservoirs 736 are in communication with a supply valve 706. Fuel and oxidant from an external source can be provided to the supply valves 704, 706 and, in turn, to the reservoirs 734, 736 as needed. In one embodiment, shown in FIG. 19, the external source of fuel and oxidant is one or more interchangeable bottles/tanks (containers) 740. The bottles/tanks 740 can either be replaced or replenished when their supply has been exhausted. Again, such replenishing or replacement can be accomplished by divers, ROVs, or AUVs, for example.

Figure 20:
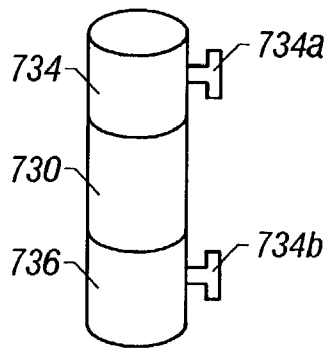
FIG. 20 illustrates the fuel cell reservoirs in direct communication with an external supply of energy resources.

In alternative embodiments, the one or more fuel cells 730 providing power to the production manifold 700 are not located within a power supply housing 702. The fuel cells 730 can be affixed to the structure of the production manifold 700 or secured in proximity of the production manifold 700. In such instances, the methods of replacing and replenishing discussed above remain applicable. For example, as shown in FIG. 20, the oxidant reservoir 734 and the fuel reservoir 736 are in direct communication with supply valves 734a, 736b, respectively. Thus, the oxidant and fuel can be replenished from an external source as discussed above.

Figure 21:
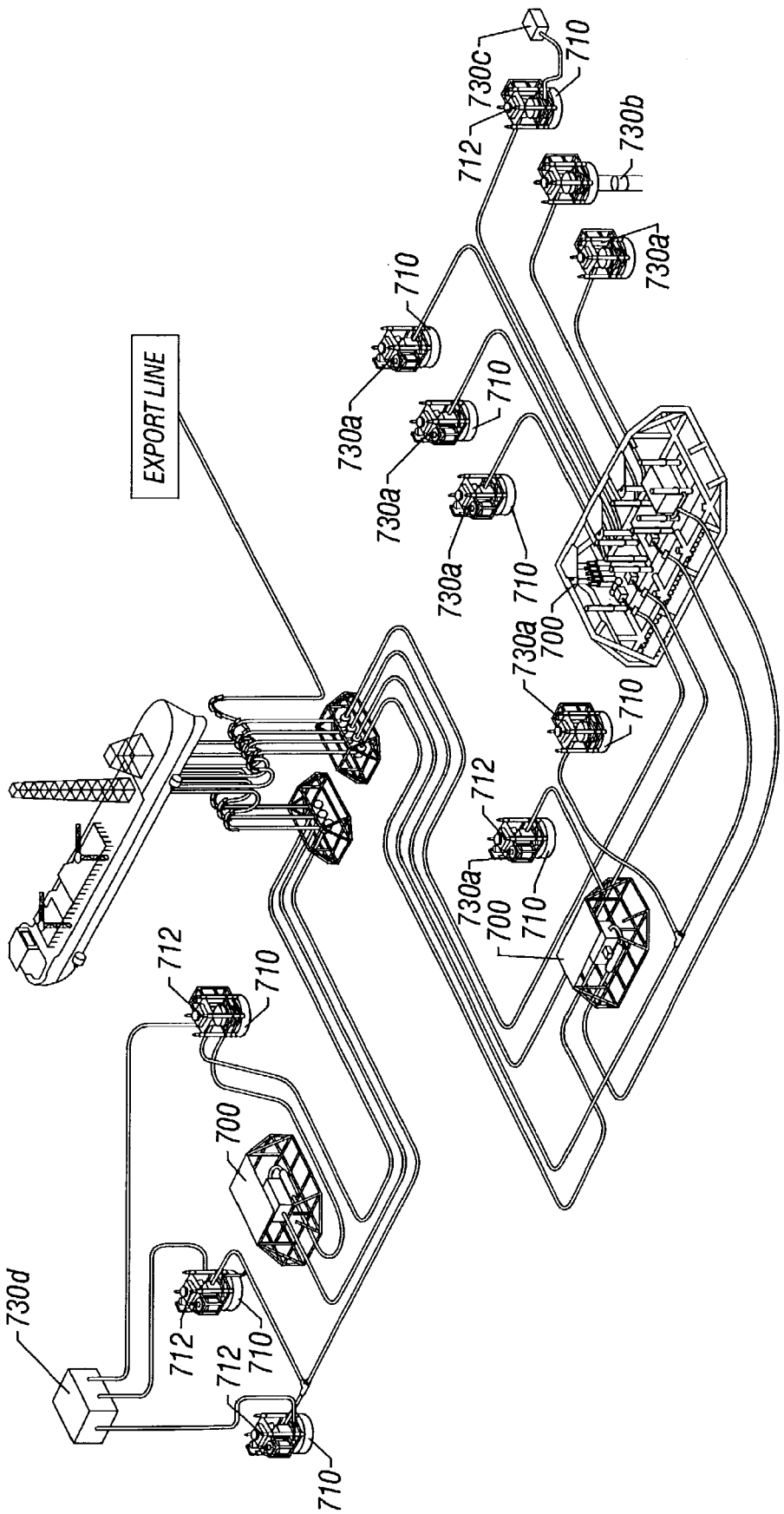
FIG. 21 is an illustration of a subsea field powered by fuel cells locally situated at the individual wellheads.

In another embodiment of the present invention, shown in FIG. 21, the fuel cells 730 are locally situated at the individual wellheads 710 and associated equipment. In this embodiment, the need for distribution cabling (indicated by reference 704 in FIG. 16) from the production manifold 700 is removed. As shown, the fuel cells 730 can be located within the wellheads 710 (indicated by 730a) or located externally to supply fuel to one or more wellheads 710 and/or seabed equipment (indicated by 730*b* and 730*c*). The fuel cell 730*b* is located downhole and the fuel cell 730*c* is external to the subsea wellhead 710 and production tree 712. Further, as indicated by 730*d*, one or more fuel cells can provide power to several wellheads 710 from an external location. As discussed with reference to the powering the production manifolds 700 above, once the fuel cells 730 have exhausted their resources of oxidant and fuel, the fuel cells 730 can be replaced or the oxidant and fuel supply can be replenished from external sources such as recoverable bottles/tanks. Such replenishing or replacement can be accomplished by divers, ROVs, or AUVs, for example.

Figure 22:
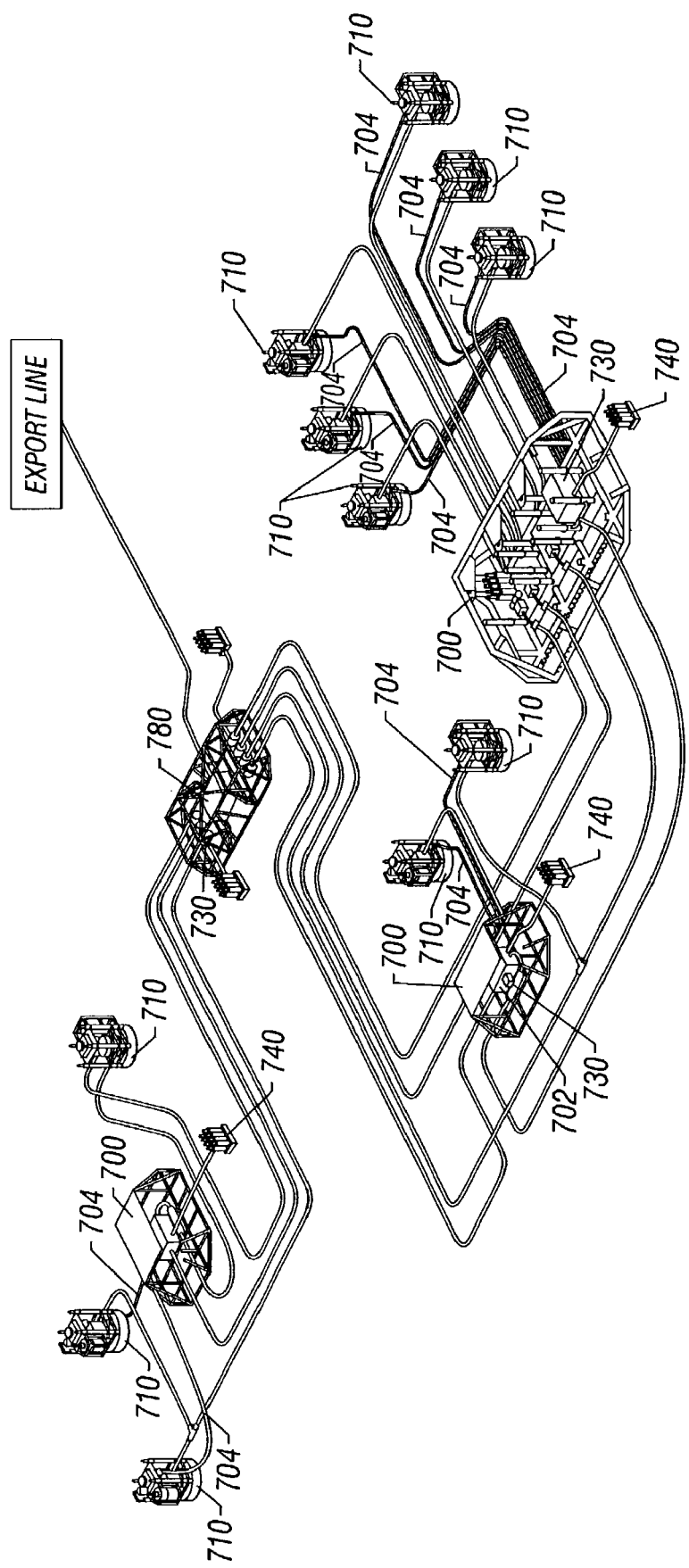
FIG. 22 is an illustration of a subsea field having a subsea processing facility, both powered by fuel cells.

FIG. 22 is illustrative of the present invention used to power a subsea field having a subsea processing facility 780. In this embodiment, the fuel cells 730 are used to power all seabed control systems. As shown, one or more fuel cells 730 provide power for the subsea processing facility 780 to facilitate multiphase boosting, multiphase flow metering, subsea separation and water injection. Similarly, one or more fuel cells 730 provide power for the various production manifolds 700. The power is distributed from the production manifolds 700 to the subsea wellheads 710 and associated equipment through distribution cabling 704.

In the embodiment shown, the fuel cells 730 are supplied oxidant and fuel from recoverable bottles/tanks 740. As discussed above, the bottles/tanks 740 can also be used to replenish exhausted supplies of oxidant and fuel. To facilitate the replenishment, divers, ROVs, or AUVs, can be used to perform the operation.

Figure 23:
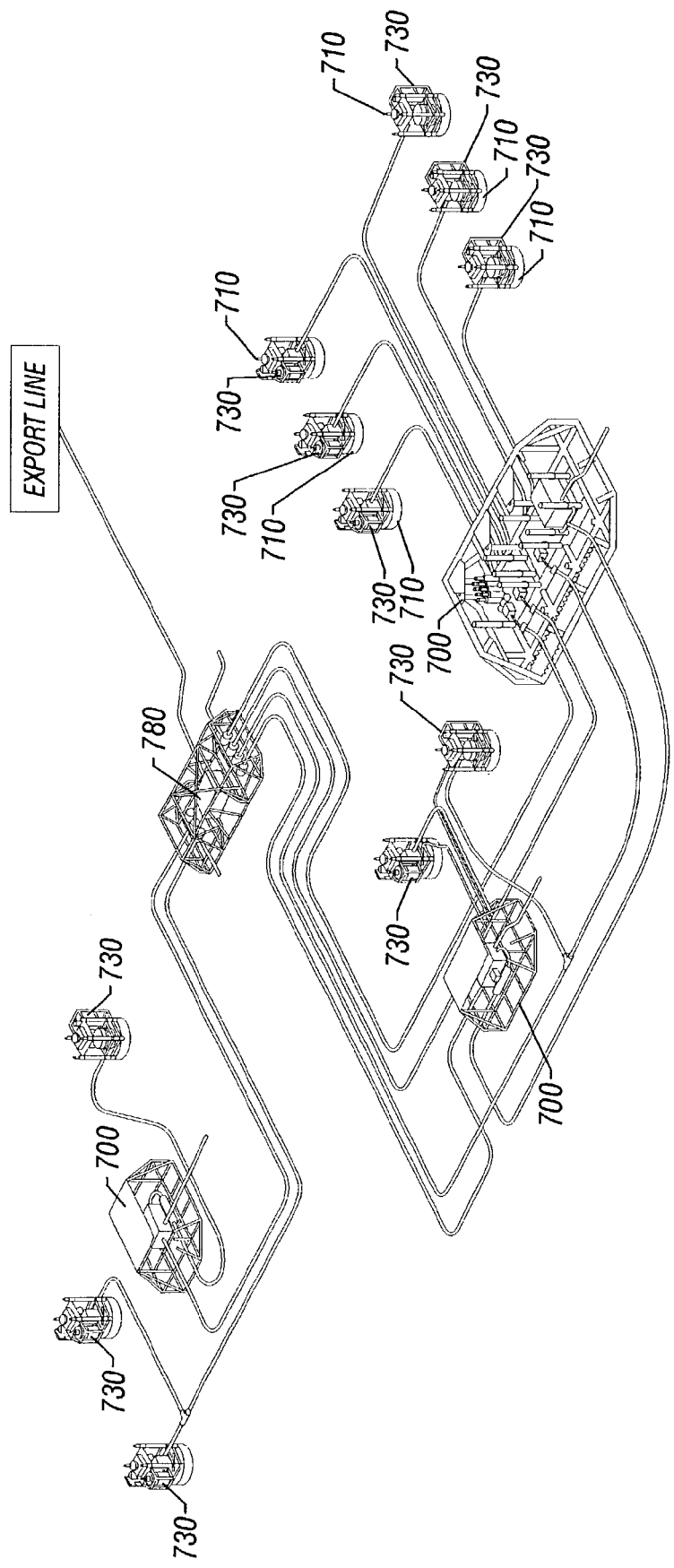
FIG. 23 illustrates a subsea field wherein the fuel cells provide power directly to the subsea wellheads.

FIG. 23 illustrates a subsea field wherein the fuel cells 730 provide power directly to the subsea wellheads 710 and associated equipment. In this embodiment, the need for the distribution cabling 704 (shown in FIG. 22) from the production manifolds 700 is removed. Incorporating wireless communications, such as electromagnetic transmission along flowlines or acoustic and blue-green laser, in combination with a subsea processing facility 780 (as described with reference to FIGS. 22 and 23) and the fuel cells 230, the need for umbilicals to the surface is removed. Such embodiments is particularly advantageous when applied to satellite wells located remote from a production facility.

Figure 24:
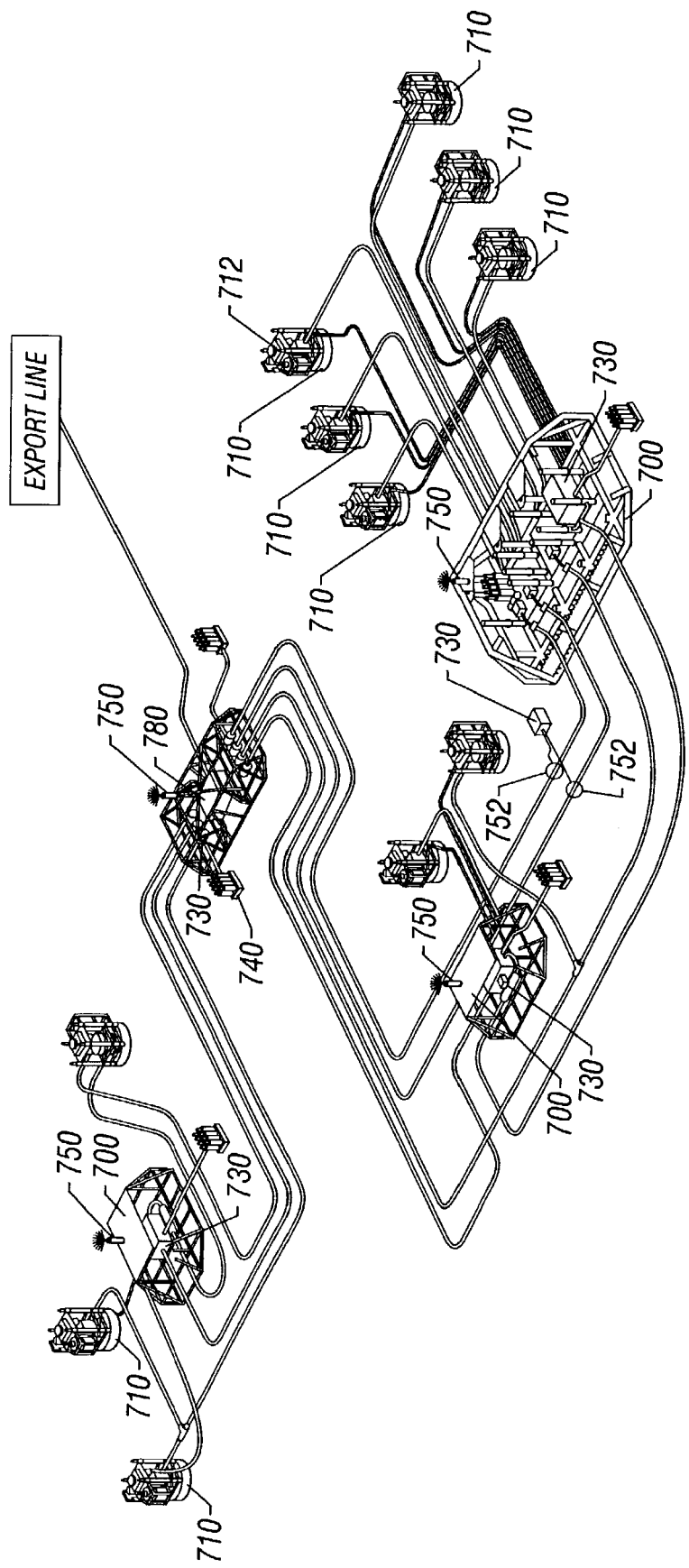
FIG. 24 illustrates the fuel cells powering a communications hub.

In another embodiment, the fuel cells are used to power a communications hub. As shown in FIG. 24, the fuel cells 730 provide power to communication transmitters/repeaters 750, thus providing a seabed network throughout an entire field. In the embodiment shown in FIG. 24, the communication transmitters/repeaters 750 are located at the subsea processor 780 and the production manifolds 700 to provide a communication link. In another embodiment, the communication transmitters/repeaters 750 can be located at individual wellheads 710 or production trees 712, for example.

In yet another embodiment, shown schematically in FIG. 24, the fuel cells 730 are used to power pipeline monitoring devices 752. The pipeline monitoring devices 752 include pipeline stress, corrosion and temperature measurement devices, as well as communication transmitters.

Figure 25:
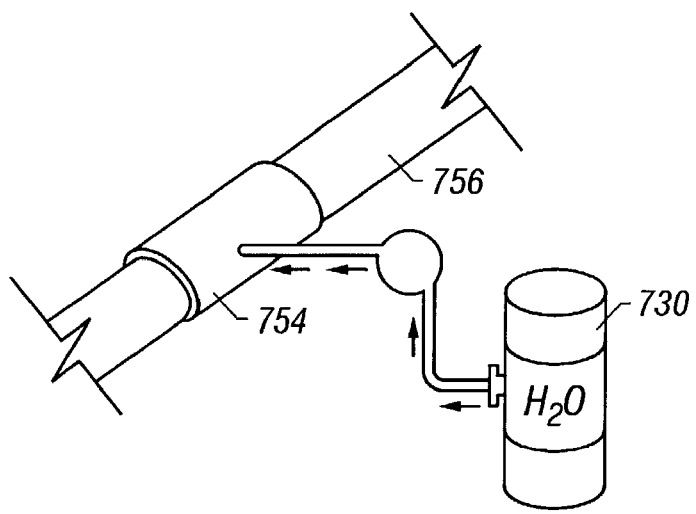
FIG. 25 illustrates the hot water generated by the fuel cells used in a flow loop.
Figure 26:
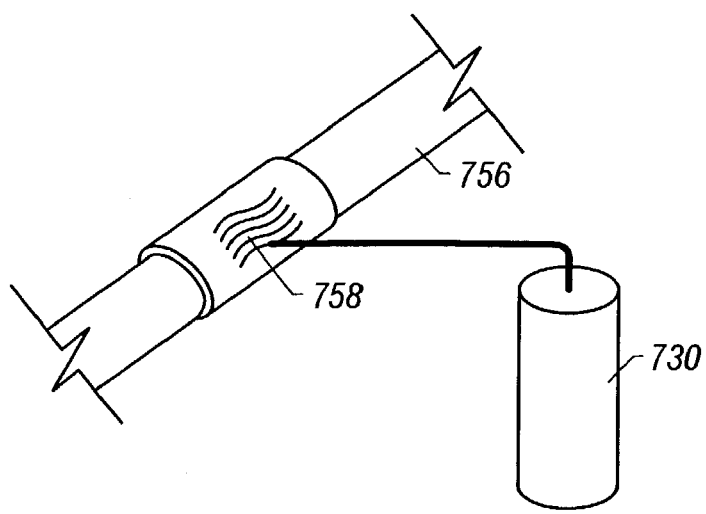
FIG. 26 illustrates the fuel cells powering a heating element.

In still another embodiment, the fuel cells are used for hot water generation. As shown in FIG. 25, the hot water by-product of the fuel cells 730 is hot water that can be introduced into flow loops 754 affixed around the production piping 756 to counter hydrate or waxing problems. Similarly, as shown in FIG. 26, the fuel cells 730 can be used to power a heating element 758 to heat the pipe 756 to again counter hydrate or waxing problems.

Figure 27:
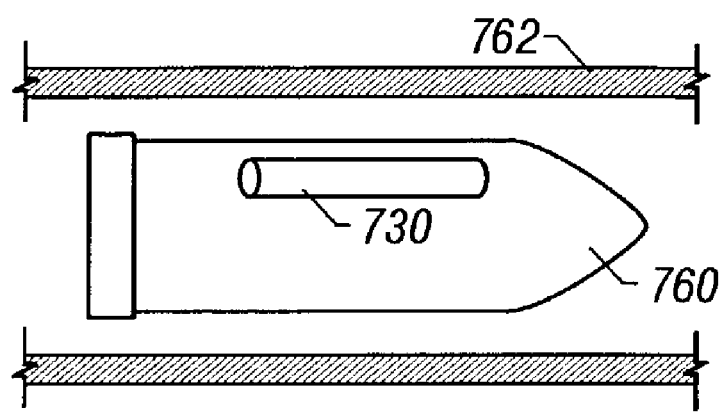
FIG. 27 illustrates the fuel cells used to provide local power for an intelligent pig.

In still another embodiment, shown in FIG. 27, the fuel cells are used to provide local power for intelligent pigs 760. Rather than rely on external power for movement within a pipeline 762, the fuel cells 730 provide an internal source of power for the pigs 760, which in turn are able to provide traction drive measurement and communication capabilities.

Figure 28:
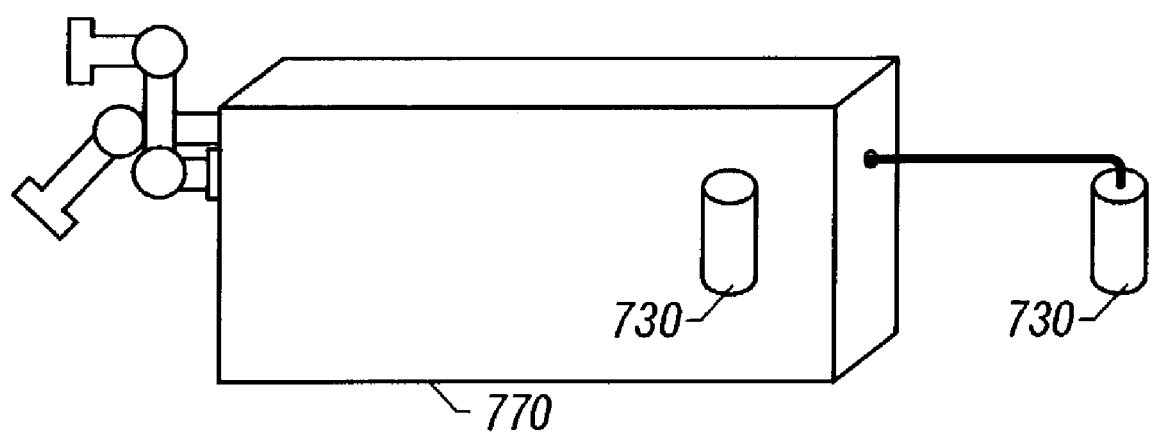
FIG. 28 illustrates the fuel cells used to provide power for mechanical manipulators/robots.

In yet another embodiment, shown schematically in FIG. 28, the fuel cells are used to provide power for mechanical manipulators/robots 770. As shown in the Figure, the mechanical manipulators/robots 770 can be powered from an internal fuel cell 730 or can be powered by an fuel cell 730. Further, the mechanical manipulators/robots 770 can have a battery rechargeable by the fuel cells 730. The remote manipulators enable autonomous maintenance tasks such as fuel/oxidant storage replenishment, hardware changeout, seabed/pipeline surveys and remote intervention. The manipulators include fixed wellhead manipulators, manifold trolley systems, and mobile seabed units, for example.

The aforementioned examples for which the present invention can be used to advantage is intended to be illustrative and not limiting of the scope of the present invention. The fuel cells of the present invention can be used to provide power to any number of subsea processors, distributors, and equipment. Additional examples of use include hydrate control, chemical injection, flow assurance, battery charging, beacons, separation systems, seismic source acquisition, subsea phase testing, subsea welding, diving systems (habitat), gas compression, and ROV recharge, for example.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A subsea power system, comprising at least one fuel cell disposed proximate a sea floor for providing electrical power to at least one of a subsea apparatus for operating on a well and a subsea apparatus for operating on production from the well, wherein the at least one fuel cell is disposed in an annular space between a production tubing and a well, further comprising at least one reservoir, wherein the at least one fuel cell defines at least one drain hole in fluid communication with the at least one reservoir, such that water generated by the at least one fuel cell may flow through the at least one hole and be stored in the at least one reservoir, wherein the at least one fuel cell further comprises a fuel cell stack, and wherein the fuel cell stack defines at least one radial channel for carrying the generated water to the at least one drain hole.

2. A subsea power system, comprising at least one fuel cell disposed proximate a sea floor for providing electrical power to at least one of a subsea apparatus for operating on a well and a subsea apparatus for operating on production from the well, wherein the at least one fuel cell is disposed in an annular space between a production tubing and a well, further comprising at least one reservoir, wherein the at least one fuel cell defines at least one drain hole in fluid communication with the at least one reservoir, such that water generated by the at least one fuel cell may flow through the at least one hole and be stored in the at least one reservoir, wherein the at least one fuel cell further comprises a fuel cell stack, and wherein the fuel cell stack is sloped.

3. A subsea power system, comprising at least one fuel cell disposed proximate a sea floor for providing electrical power to at least one of a subsea apparatus for operating on a well and a subsea apparatus for operating on production from the well, wherein the at least one fuel cell is disposed in an annular space between a production tubing and a well, further comprising at least one reservoir, wherein the at least one fuel cell defines at least one drain hole in fluid communication with the at least one reservoir, such that water generated by the at least one fuel cell may flow through the at least one hole and be stored in the at least one reservoir, wherein the at least one fuel cell further comprises a fuel cell stack, and wherein the fuel cell stack has a shape selected from the group consisting of frustoconical, conical, hemispherical, and bowl-shaped.

4. A subsea power system, comprising at least one fuel cell disposed proximate a sea floor for providing electrical power to at least one of a subsea apparatus for operating on a well and a subsea apparatus for operating on production from the well, wherein the fuel cell further comprises one of a replaceable fuel reservoir and a replenishable fuel reservoir and one of a replaceable oxidant reservoir and a replenishable oxidant reservoir.

5. A subsea power system, according to claim 4, wherein the fuel reservoir and the oxidant reservoir are in fluid communication with at least one storage tank.

6. A subsea power system, according to claim 4, wherein the fuel reservoir and the oxidant reservoir are in fluid communication with an underwater vehicle.

* * * * *